(12) United States Patent
Craig

(10) Patent No.: US 11,060,047 B2
(45) Date of Patent: Jul. 13, 2021

(54) APPARATUS AND METHOD FOR EXTRACTING ESSENTIAL OILS

(71) Applicant: Scott E. Craig, Vancouver, WA (US)

(72) Inventor: Scott E. Craig, Vancouver, WA (US)

( * ) Notice: Subject to any disclaimer, the term of this patent is extended or adjusted under 35 U.S.C. 154(b) by 0 days.

(21) Appl. No.: 16/997,625

(22) Filed: Aug. 19, 2020

(65) Prior Publication Data
US 2021/0179967 A1 Jun. 17, 2021

Related U.S. Application Data

(60) Provisional application No. 62/889,157, filed on Aug. 20, 2019.

(51) Int. Cl.
*B01D 11/02* (2006.01)
*C11B 1/10* (2006.01)
(Continued)

(52) U.S. Cl.
CPC ............. *C11B 1/10* (2013.01); *B01D 11/02* (2013.01); *B01D 11/0207* (2013.01);
(Continued)

(58) Field of Classification Search
CPC . C11B 1/10; C11B 3/001; C11B 3/006; C11B 3/008; B01D 11/02; B01D 11/0207; B01D 11/0223; B01D 11/0226; B01D 11/0257; B01D 11/0273; B01D 11/0276; B01D 21/26; B01D 21/262; B01D 29/23; B01D 29/25; B01D 29/35; B01D 29/356; B01D 36/04; B01D 36/045; B04B 3/00; B04B 3/02; B04B 7/02; B04B 7/16;
(Continued)

(56) References Cited

U.S. PATENT DOCUMENTS 1,921,446 A * 8/1933 Andrews ............... B04B 11/043
                                                    210/100
2,170,547 A * 8/1939 Christian ............... B30B 9/128
                                                    100/129
(Continued)

OTHER PUBLICATIONS

International Search Report dated Jan. 5, 2021, issued in corresponding International Application No. PCT/US2020/047052, filed Aug. 19, 2020, 9 pages.

*Primary Examiner* — Joseph W Drodge
(74) *Attorney, Agent, or Firm* — Christensen O'Connor Johnson Kindess PLLC

(57) ABSTRACT

A system and method for extracting essential oils from organic material is provided. One embodiment places organic material into an extraction chamber that is a cylindrical wall of rigid material, wherein a diameter and a height of the extraction chamber is sized to define an interior that accommodates a desired amount of an organic material having essential oils; fills the extraction chamber with a solvent after the organic matter has been placed into the extraction chamber; and moves a vortex plunger disposed over the surface of the organic material in a repeated upward and downward motion during an agitation process so that the vortex vanes generate a fluid vortex in the solvent, wherein the fluid vortex causes the solvent to be drawn upward into the organic material and then to be pushed downward through the organic material so that the solvent extracts essential oils from the organic material.

17 Claims, 8 Drawing Sheets

(51) Int. Cl.
- *B04C 5/08* (2006.01)
- *B04C 5/10* (2006.01)
- *B04C 5/081* (2006.01)
- *B04C 5/103* (2006.01)

(52) U.S. Cl.
CPC ...... *B01D 11/0257* (2013.01); *B01D 11/0273* (2013.01); *B04C 5/081* (2013.01); *B04C 5/10* (2013.01); *B04C 5/103* (2013.01)

(58) Field of Classification Search
CPC .... B04B 7/18; B04B 9/02; B04B 9/10; B04B 11/04; B04B 13/00; B30B 9/06; B30B 9/08; B30B 9/20; B30B 9/205; B30B 9/26; B30B 9/267; B30B 15/30; B30B 15/32; B04C 5/08; B04C 5/081; B04C 5/10; B04C 5/103; B04C 9/00
USPC ........ 100/104, 110, 111, 116, 117, 126, 127, 100/130; 210/360.1, 377, 380.1, 383, 210/511, 634
See application file for complete search history.

(56) References Cited

U.S. PATENT DOCUMENTS

| | | | |
|---|---|---|---|
| 2,776,305 A * | 1/1957 | Lojo | B01D 11/0434 208/339 |
| 2,817,288 A * | 12/1957 | Peters | B30B 9/06 100/52 |
| 3,168,033 A * | 2/1965 | Hansen | B30B 9/067 100/179 |
| 3,438,500 A * | 4/1969 | Pico | B04B 3/025 210/213 |
| 3,939,065 A * | 2/1976 | Einarsson Ahlfors | B01D 33/073 209/240 |
| 4,253,390 A * | 3/1981 | Hunt | A23N 15/025 100/117 |
| 5,041,245 A * | 8/1991 | Benado | C11B 1/104 554/10 |
| 2009/0223875 A1* | 9/2009 | Asal | B04C 9/00 209/133 |
| 2012/0301800 A1* | 11/2012 | Carew | H01M 8/0643 429/416 |
| 2016/0184735 A1* | 6/2016 | Wardle | B01J 19/18 210/634 |
| 2018/0030372 A1 | 2/2018 | Maki et al. | |
| 2018/0214792 A1 | 8/2018 | Balass | |
| 2019/0016989 A1 | 1/2019 | Steele | |
| 2019/0240593 A1* | 8/2019 | Murphy | C11B 1/10 |
| 2020/0222830 A1* | 7/2020 | Carew | B01D 29/35 |
| 2020/0269170 A1* | 8/2020 | Vette | B30B 9/06 |

* cited by examiner

APPARATUS AND METHOD FOR EXTRACTING ESSENTIAL OILS

PRIORITY CLAIM

This application claims priority to U.S. Application, Ser. No. 62/889,157, filed on Aug. 20, 2019, entitled Systems and Methods For Extracting Oils From Biomass, which is hereby incorporated by reference for all purposes.

BACKGROUND OF THE INVENTION

Essential oils may denote a group of native substances which are obtainable from organic and/or inorganic material. For example, essential oils may include hydrocarbons, such as terpenes and the oxygenated compounds. Many essential oils that have applications in the food industry, the tobacco industry, the perfume industry, and the pharmaceutical industry. For example, essential oils are widely used as ingredients for fragrances, flavoring mixtures, and medicinal remedies. To put the essential oils in a usable form, the essential oils are extracted from the organic or inorganic materials.

The essential oils are obtained by extracting the oils from the organic materials and/or inorganic materials using an extraction processes. Legacy extraction processes may include steam distillation, solvent extraction, or mechanical separation such as pressing of the essential oils from the plant material. For steam distillation, the essential oils may be separated or distilled by decantation of the essential oil from a steam distillate. For solvent extraction or mechanical separation or pressing, the essential oils may be filtered from a solvent or remnant materials using a filter The legacy afore-mentioned processes, however, may be inefficient, time consuming, expensive, and may also degrade the organic and/or inorganic materials during the extraction process. In the case of solvent extraction, solvents may be applied to the organic material and/or the inorganic material. For example, butane may be used in solvent extraction to extract compounds from essential oil material or *cannabis* plant to essentially create an essential oil or *cannabis* concentrate.

Accordingly, in the arts of essential oils extraction there is a need in the arts for an improved methods, apparatus, and systems for extracting essential oils from organic materials and/or inorganic materials.

SUMMARY OF THE INVENTION

Embodiments of the electronic device use history system provide a system and method for extracting essential oils from organic material. One embodiment places organic material into an extraction chamber that is a cylindrical wall of rigid material, wherein a diameter and a height of the extraction chamber is sized to define an interior that accommodates a desired amount of an organic material having essential oils; fills the extraction chamber with a solvent after the organic matter has been placed into the extraction chamber; and moves a vortex plunger disposed over the surface of the organic material in a repeated upward and downward motion during an agitation process so that the vortex vanes generate a fluid vortex in the solvent, wherein the fluid vortex causes the solvent to be drawn upward into the organic material and then to be pushed downward through the organic material so that the solvent extracts essential oils from the organic material.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
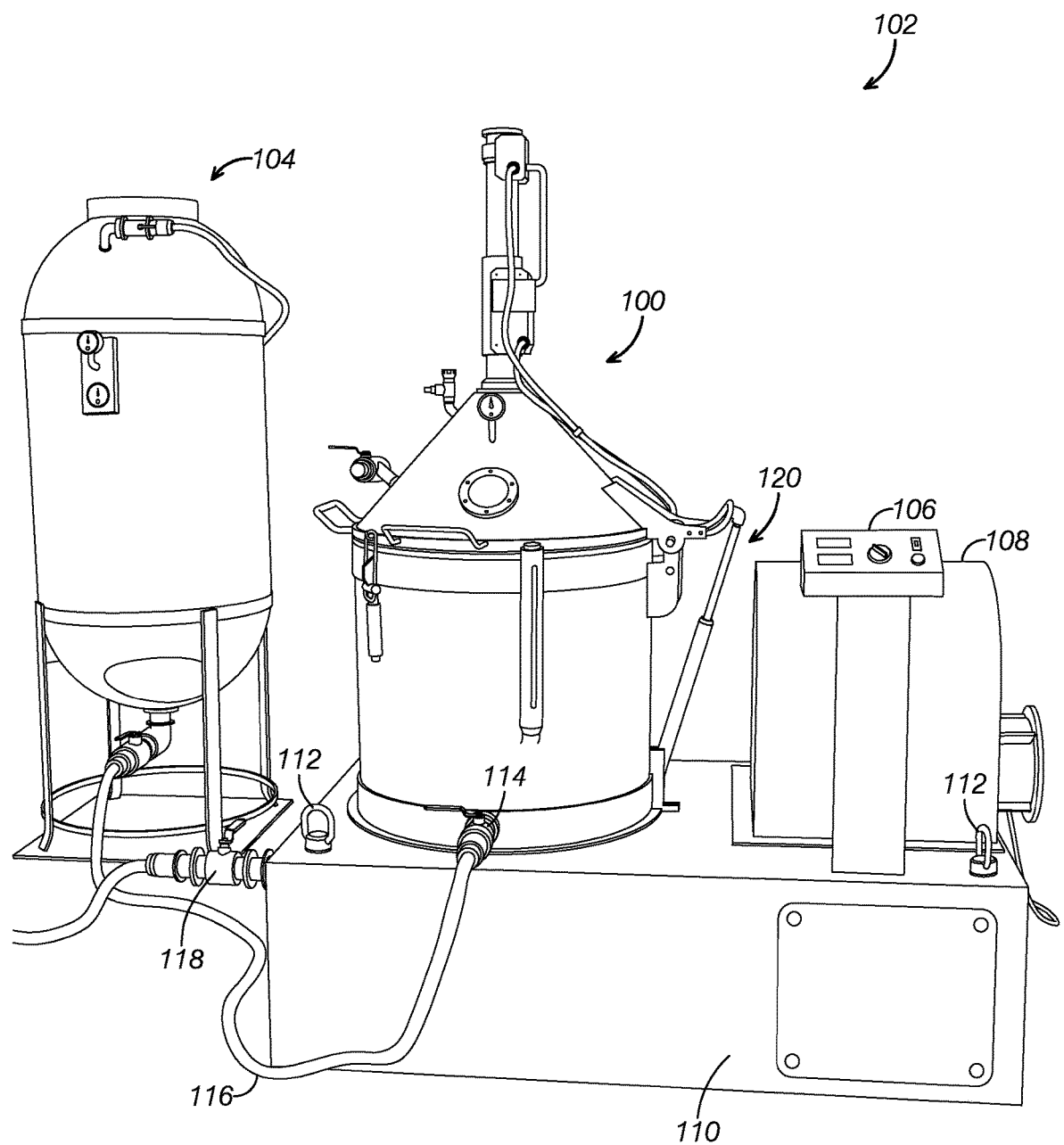
FIG. 1 is a view an essential oil extraction system.

FIG. 1 is a view an essential oil extraction system 100 implemented as part of an extractor 102. The extractor 102 further includes a solvent source 104, a controller 106, a centrifuge motor system 108, and an optional frame 110. Embodiments of the essential oil extraction system 100 extract essential oils from organic material (interchangeably referred to herein as biomass), such as plants or selected parts of a plant.

In an example embodiment, the controller 106 includes a display and a plurality of user input devices. In some embodiments, the controller may be remotely located from the frame 110, such as in a remote control room. Such embodiments of the controller 106 may be implemented in a desktop computer, laptop computer, tablet, personal device assistant, smart phone, handheld device, or the like.

The essential oil extraction system 100 is fluidly coupled to the solvent source 104, is controllably coupled to the controller 106, and is coupled to the centrifuge motor system 108. In a nonlimiting example embodiment, the essential oil extraction system 100, the controller 106, and the centrifuge motor are mounted on the frame 110. The optional frame 110 provides a stable operating platform for operation of the extraction system 100, and facilitates moving of the essential oil extraction system 100 to a desired location by providing a plurality of optional hoist rings 112. In other embodiment, a different structure may be used to secure the various components of the extractor 102. Alternatively, or additionally, selected components of the extractor 102 may be secured to the floor surface or another suitable surface, and/or may freely rest on the floor surface or another suitable surface.

A solvent inlet valve 114 is coupled to a hose 116 that fluidly connects to the solvent source 104. Prior to use, a solvent is transferred into the essential oil extraction system 100 via the hose 116. A solvent outlet valve 118 provides a means to retrieve the solvent with essential oils therein after completion of the operation of the essential oil extraction system 100. The solvent with the essential oils therein is preferably transferred to a separate receiving container, tank, or the like (not shown).

An optional lid opening and closing actuator 120 may be used in some embodiments to open and close the top of the essential oil extraction system 100 so that organic material may be added into and be removed from the essential oil extraction system 100. The actuator 120 may be a pneumatic solenoid, an air solenoid, or an electronic solenoid. In some embodiments, the actuator 120 may be controllably coupled to the controller 106. In alternative embodiments, the user manually opens and closes the essential oil extraction system 100.

The disclosed systems and methods for the essential oil extraction system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for essential oil extraction system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Those skilled in the art will appreciate that a wide variety of additional system components, such as, but not limited to, sensors, actuators, pumps, additional vessels, ports with sight glass, handles, or the like may be incorporated in embodiments of the essential oil extraction system 100 without deviating from the principals of operation described herein. Other embodiments may include suitable piping, valves and/or fluid control features.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device is communicatively connected to another electronic device, either wirelessly or with a wire based connector, whether directly or indirectly through a communication network (not shown). "Controllably coupled" means that the electronic device is controls operation of the other electronic device.

Figure 2:
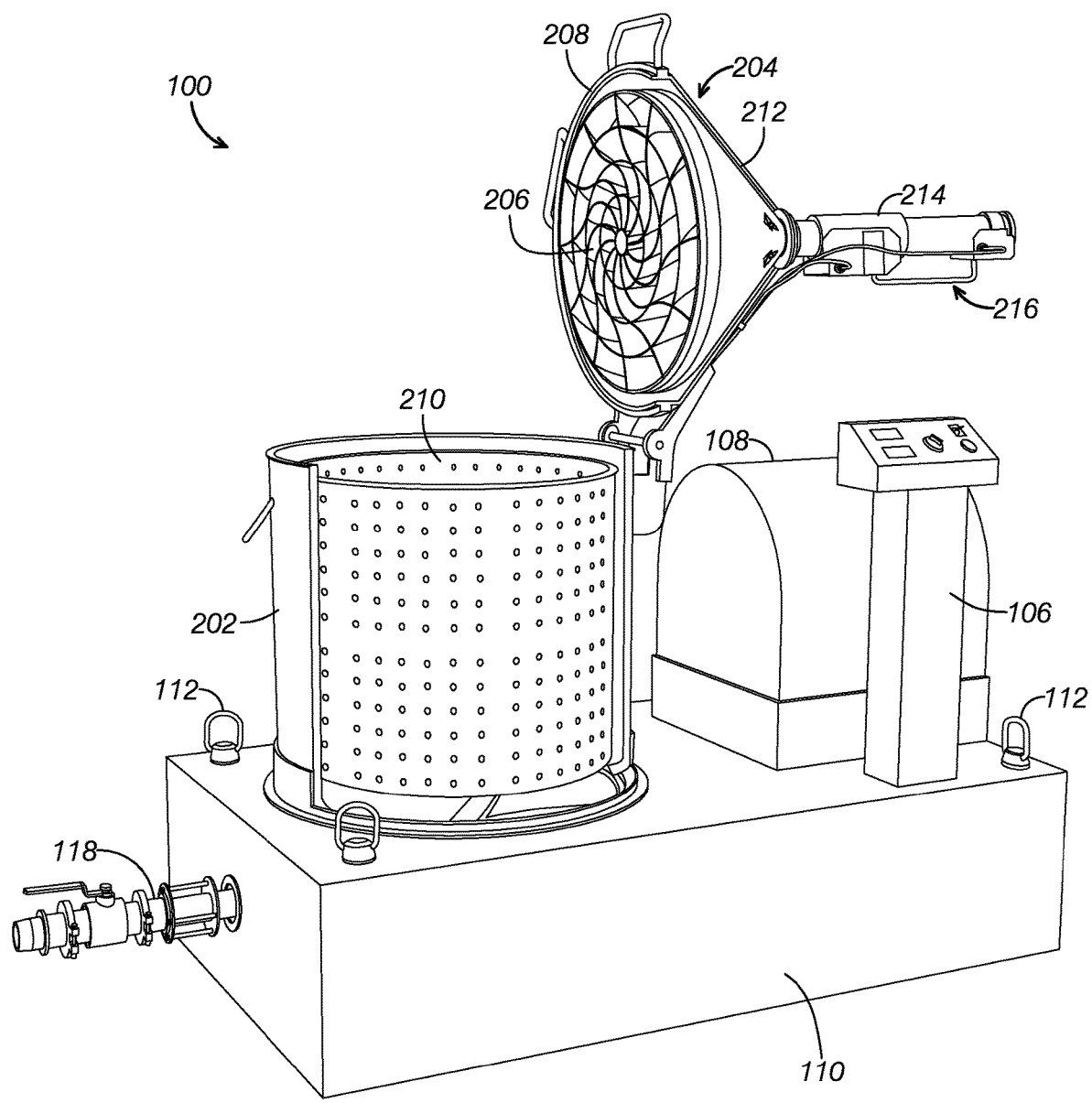
FIG. 2 is a cutaway view of the essential oil extraction system.

FIG. 2 is a cutaway view of the essential oil extraction system 100 illustrating the interior region of an extraction chamber 202 (interchangeably referred to herein as a processing vessel), a chamber lid 204, and a vortex plunger 206. The extraction chamber 202 is a cylindrical wall of rigid material that is sized to accommodate a desired amount of organic material having the essential oils of interest and an amount of the solvent of choice. Any suitable material, such as metal, acrylic, glass, or the like may be used to fabricate the extraction chamber 202 and/or the chamber lid 204. One skilled in the arts appreciates that the essential oil extraction system 100 size is scalable to any dimensions of interest. That is, the diameter and the height of the extraction chamber 202 may be defined based on the amount of organic material that is to be processed. For example, the size of the essential oil extraction system 100 may range from countertop systems suitable for home use to large scale industrial systems suitable for commercial and/or agricultural use.

The chamber lid 204 has a lower rim 208 that is defined by a diameter that corresponds to the diameter of the extraction chamber 202. The lower rim 208 is mate with a top of the extraction chamber 202. In a preferred embodiment, the lower rim 208 is pivotably attached to the top of the extraction chamber 202. When closed, the chamber lid 204 sealably closes the extraction chamber 202 during the extraction process. In some embodiments, a gasket or other sealing material (not shown) may be disposed between the lower rim 208 and the top of the extraction chamber 202 to provide an improved seal. When the chamber lid 204 is open, a user may add the organic material with the essential oils that is to be extracted into the extraction chamber 202, or the user may remove the processed organic material from the extraction chamber 202 after the extraction process has been completed.

A basket 210 (interchangeably referred to herein as a filter drum, centrifuge drum, or the like) fits within the extraction chamber 202. The organic material is placed in the basket 210. The bottom of the basket 210 is coupled to, or is removably coupled to, the centrifuge motor system 108 such that the basket 210 may be rotated so as to create a centrifugal force that extracts the solvent with the extracted essential oils from the organic material to facilitate the pumping of the solvent with essential oils therein into a separate receiving vessel, tank, or the like. Here, the centrifuge motor system 108 is coupled to the basket 210 through the bottom of the extraction chamber 202 in a sealable fashion such that when solvent is in the extraction chamber 202, solvent is unable to leak out of the extraction chamber 202. Some embodiments use a drive shaft system to couple the centrifuge motor system 108 to the basket 210. Other embodiments may use a magnet system to couple the centrifuge motor system 108 to the basket 210.

The outside diameter of the basket 210 is less than the inside diameter of the extraction chamber 202 so as to be able to freely rotate within the extraction chamber 202 when rotated by the centrifuge motor system 108. Further, the inside diameter of the basket 210 is defined or designed to provide sufficient space between the outside surface of the basket 210 and the inside wall of the extraction chamber 202. This space provides spacing for the extracted solvent to flow through the extraction chamber 202 to the solvent outlet valve 118 after completion of the extraction process. In the various embodiments, a plurality of apertures are disposed in the wall of the basket 210 to permit the flow of the extracted solvent out from the organic material and into the space between the basket 210 and the extraction chamber 202.

The middle portion 212 of the chamber lid 204 is generally conical in shape. The dimensions of the middle portion 212 are defined or designed to receive the retraction of the vortex plunger 206 into the middle portion 212 to facilitate opening and closing of the chamber lid 204. This retraction may be interchangeably referred to herein as "parking" the vortex plunger 206. Further, moving the vortex plunger 206 out of the space where the centrifuging process occurs avoids the vortex plunger 206 from interfering with moving or rotating components, and/or from disrupting the balance of the rotating basket 210. In alternative embodiments, the vortex plunger 206 is designed to assist in the balancing of the rotating basket 210.

The upper portion 214 of the chamber lid 204 secures a vortex plunger agitator system 216 that is controllably coupled to the controller 106. The vortex plunger agitator system 216 is configured to extend the vortex plunger 206 downward into the interior of basket 210 residing in the extraction chamber 202. Further, the vortex plunger agitator system 216 is configured to retract the vortex plunger 206 into the middle portion 212 of the chamber lid 204 to facilitate the opening of the chamber lid 204. During the extraction process, the agitator system 216 is configured to move the vortex plunger 206 in the repeated upward and downward motion to move the solvent through the organic material during an agitation process.

In an example embodiment, agitator system 216 is communicatively coupled to the controller 106. Preferably, the vortex plunger agitator system 216 is a pneumatic solenoid that is controlled by the controller 106. In alternative embodiments, the vortex plunger agitator system 216 may be an air or fluid solenoid, or an electronic solenoid, controlled by the controller 106. For example, a fluid solenoid may be a food grade hydraulic cylinder.

To facilitate cleaning or maintenance, the basket 210 may be removed from the extraction chamber 202. Alternatively, or additionally, the cylindrical side wall of the extraction chamber 202 may be removable from the bottom portion of the extraction chamber 202. Alternatively, or additionally, the entire basket 210 may be removeable from the extraction chamber 202. Similarly, the chamber lid 204 may be optionally removable from the extraction chamber 202 to facilitate cleaning and/or maintenance. In a preferred embodiment, the vortex plunger 206 is removably secured to the agitator system 216 so that the vortex plunger 206 can be removed for cleaning, maintenance, and/or replacement with a different vortex plunger 206.

Figure 3:
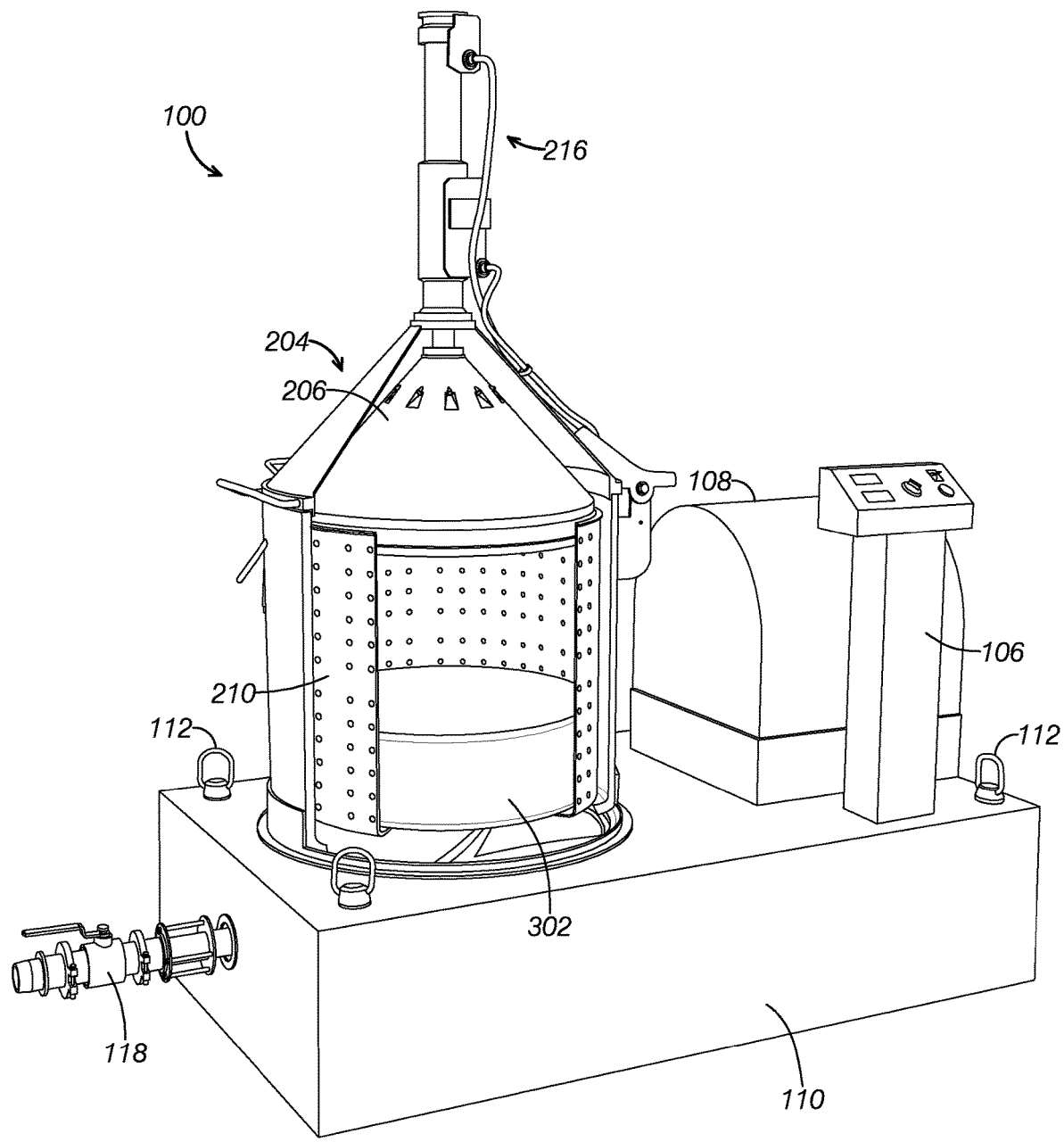
FIG. 3 is a partial cutaway view of the essential oil extraction system with the chamber lid in a closed position and the vortex plunger in a partially retracted position.

FIG. 3 is a partial cutaway view of the essential oil extraction system 100 with the chamber lid 204 in a closed position and the vortex plunger 206 in a partially retracted position. In a preferred embodiment, an organic material filter bag 302 filled with the organic matter that is to be processed is placed into the bottom of the basket 210.

The organic material filter bag 302 is made of a porous material, such as a fabric, fine mesh screen, or the like. The organic matter that is to be processed, in a preferred embodiment, is placed within the interior of the liquid permeably organic material filter bag 302. Prior to initiation of the extraction process, the user places the filled organic material filter bag 302, or a plurality of filled organic material filter bags 302, into the bottom of the basket 210 residing in the extraction chamber 202. In some embodiments, the organic material filter bag 302 is not used.

The organic material filter bag 302 secures and retains the organic matter in the bottom portion of the basket 210 while solvent is being drawn through the organic matter during the extraction process. In some embodiments, the organic material filter bag 302 may move about and cavitate around the basket 210 to facilitate movement of the solvent through the organic material residing in the organic material filter bag 302. After completion of the extraction process, the filtering provided by the organic material filter bag 302 provides the unexpected benefit of reducing the amount and size of particulate matter that is drawn out of the extraction chamber 202 via the solvent outlet valve 118. In a preferred embodiment, the organic material filter bag 302 has sixty (60) to one hundred twenty (120) micron filter holes, though any suitable filtering holes and/or filtering material may be used.

Another unexpected advantage of using the optional organic material filter bag 302 is that a plurality of organic material filter bags 302 can be pre-filled with like organic materials, different organic materials, and/or a blend of different organic materials for later extraction. Accordingly, organic material filter bags 302 with extracted organic material can be quickly and conveniently removed from the basket 210 after the conclusion of the extraction process, and then be replaced with new filled organic material filter bag 302 so that a new extraction process can be initiated. Further, removal of the processed organic material filter bags 302 provides for an easy cleanup of the extractor 102.

Further, a plurality of filled organic material filter bags 302 can be placed into the interior of the basket 210 residing in the extraction chamber 202. Accordingly, different amounts of organic matter to be selectively processed during any particular extraction process.

Figure 4:
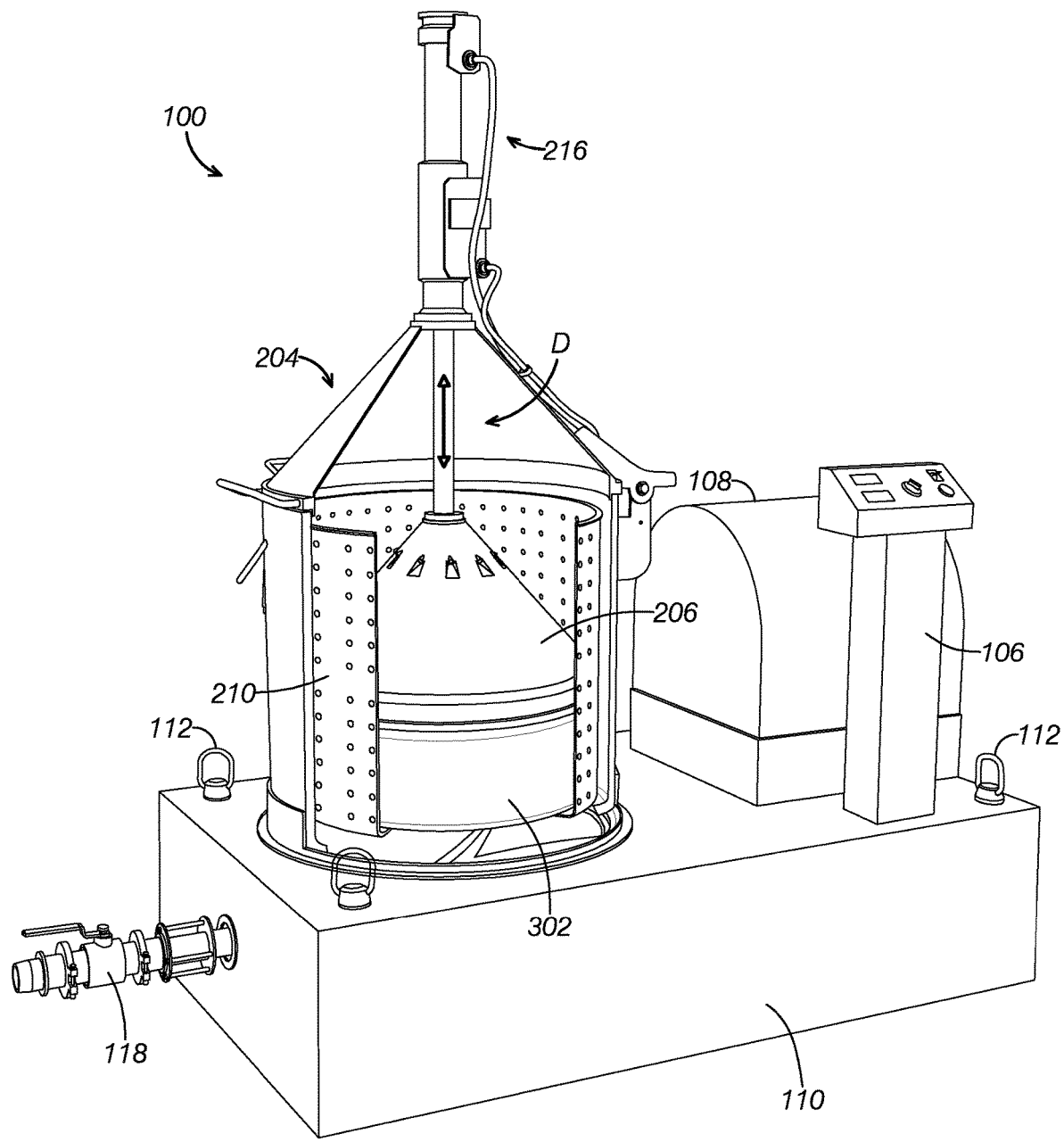
FIG. 4 is a partial cutaway view of the essential oil extraction system with the chamber lid in a closed position and the vortex plunger in an extended position above the organic material filter bag.

FIG. 4 is a partial cutaway view of the essential oil extraction system 100 with the chamber lid 204 in a closed position and the vortex plunger 206 moved by the vortex plunger agitator system 216 to an extended position above an optional organic material filter bag 302. In a preferred embodiment, the user may adjust the controller 106 to selectively define the travel length of the predefined distance that the vortex plunger agitator system 216 moves the vortex plunger 206 downward towards the top surface of the organic material filter bag 302. This travel distance may be adjusted depending upon the thickness of the organic material filter bag 302 and/or depending upon the number of organic material filter bags 302 that are placed in the basket 210 residing in the extraction chamber 202. Additionally, or alternatively, the travel distance may be adjusted based on the volume of solvent that is placed into the extraction chamber 202.

In practice, after the filled organic material filter bag 302 is placed into the interior of the basket 210 residing in the extraction chamber 202, the extraction chamber 202 is filled with the liquid solvent. Preferably, the solvent level extends well beyond to top surface of the organic material filter bag 302. In some instances, the level of solvent may even be as high as, or even higher than, the top of the basket 210 residing in the extraction chamber 202.

In a preferred embodiment, the solvent is chilled by the solvent source 104 or a chiller (not shown). For example, the temperature of the solvent may be chilled from 0° Celsius to minus 100° degrees Celsius (32° Fahrenheit to minus 148° Fahrenheit), though any desired temperature may be used. In a preferred embodiment, the preferred temperature is between minus 35° Celsius to minus 60° Celsius (minus 31° Fahrenheit to minus 148° Fahrenheit). An unexpected benefit provided by embodiments of the essential oil extraction system 100 is that legacy winterization of the essential oil laden solvent is not needed. Maintaining a cold solvent temperature prevents, or at least mitigates, waxes and lipids from releasing from the organic material. Here, maintaining the cold temperature of the solvent negates the need to separately winterize the oil laden solution after completion of the extraction process.

After the organic material filter bag 302 has been placed into the basket 210 and the chamber lid 204 has been closed and secured to the top of the extraction chamber 202, the solvent inlet valve 114 is opened to fill the extraction chamber 202 with a desired amount of solvent. After the desired amount of solvent has been added into the extraction chamber 202, the solvent inlet valve 114 is closed. In a preferred embodiment, the solvent temperature, the opening and/or closing of the solvent inlet valve 114, and/or the control of the amount of added solvent, is managed under the control of the controller 106. Alternatively, or additionally, the solvent temperature, the opening and/or closing of the solvent inlet valve 114, and/or the control of the volume of added solvent, is manually controlled. Preferably, the user may adjust the temperature of the solvent and/or the amount of added solvent using the controller 106.

Under the control of the controller 106, the vortex plunger 206 is then submerged into the solvent and is placed in proximity to the top surface of the organic material filter bag 302. In some instances the vortex plunger 206 may be substantially, or completely, submerged below the level of the solvent.

Then, the vortex plunger agitator system 216 repeatedly moves the vortex plunger 206 in an upward motion and then in a downward motion by some predefined distance (D). In a preferred embodiment, the user may adjust the controller 106 to selectively specify the travel length of the predefined distance D that the vortex plunger agitator system 216 moves the vortex plunger 206 in the upward and downward directions. In some embodiments, there may be an adjustable predefined delay between each successive upward and/or downward movement. Additionally, or alternatively, the rate at which the vortex plunger 206 in moved in the upward and downward rate may be adjustable by the controller 106 based on input by the user.

As the vortex plunger 206 is repeatedly moved in the upward and downward direction, a fluid vortex (fluid vortices) is generated within the extraction chamber 202 that draws the solvent upward through the organic material filter bag 302 (during the upward movement of the vortex plunger 206), and then pushes the solvent downward through the organic material filter bag 302 (during the downward movement of the vortex plunger 206). This generated vortex of fluid movement drawing the solvent through the organic matter residing in the organic material filter bag 302 extracts the essential oils from the organic matter. An unexpected benefit of this extraction process facilitated by the generated vortex of solvent fluid passing through the organic material filter bag 302 is that well over 90% of the essential oils, even up to nearly 100% of the essential oils, are extracted from the organic material in a very short period of time. In some instances, substantially all of the essential oils may be extracted from the organic material in less than five minutes of agitation.

In a preferred embodiment, the user is able operate the controller 106 to selectively define duration (period of time) of the agitation process. The agitation duration may be varied depending upon characteristics of the organic matter and/or the amount of organic matter that is inside the extraction chamber 202. Alternatively, or additionally, the agitation duration may be varied depending upon the volume of solvent. Further, the rate of the upward and downward movement of the vortex plunger 206 during the agitation process may be varied based on the above-described factors.

In some embodiments, the agitations process and/or the centrifuge spinning process may be conducted a plurality of different times. For example, it may be desirable to conduct a first agitation process, and then stop for some predefined rest period to permit the solvent to remain in contact with the organic matter for some duration while the solvent is extracting the essential oil. Then, after conclusion of the rest period, a second agitation process may be initiated to bring in new solvent into contact with the organic matter.

After the agitation process has been completed, in a preferred embodiment, the vortex plunger agitator system 216 retracts the vortex plunger 206 back up into the middle portion 212 of the chamber lid 204. Then, the solvent with the extracted essential oils is drained out from the extraction chamber 202 via the solvent outlet valve 118. In a preferred embodiment, the operation of the solvent outlet valve 118 and/or the pumping of the solvent by an optional pump (not shown) from the extraction chamber 202 is managed by the controller 106.

In a preferred embodiment, after the agitation process has been completed and the solvent outlet valve 118 has been opened, the centrifuge motor system 108 is actuated to spin (rotate) the basket 210 to facilitate removal of the solvent with the extracted essential oils from the extraction chamber 202. Here, the basket rapidly spins to create a centrifugal force that draws the solvent with the extracted essential oils out from the organic material residing within the organic material filter bag 302. In some embodiments, the vortex plunger 206 may also be spun by the centrifuge motor system 108.

In a preferred embodiment, the centrifugal spinning removes nearly all of the extracted solvent from the extraction chamber 202 and the organic material filter bag 302, which is then recovered via the opened solvent outlet valve 118. An unexpected advantage of this centrifugal spinning process is that the solvent with the extracted essential oils can be nearly completely removed from the organic material. Another unexpected advantage is that the solvent with the extracted essential oils can be drawn from the organic material in a very short time, such as just a few minutes. In a preferred embodiment, the user is able operate the controller 106 to selectively define the duration (period of time) of the centrifuge spinning process and/or the rotational speed of the centrifuge spinning of the basket 210.

Summarizing, after the filled organic material filter bag 302 is placed in the extraction chamber 202 and the chamber lid 204 is closed and secured, the extraction chamber 202 is filled with solvent. The vortex plunger 206 is extended downward into the solvent so as to be in proximity to the top surface of the organic material filter bag 302. After several minutes of agitation, the solvent draws all of, or nearly all of, the essential oils from the organic material secured within the organic material filter bag 302. Then, several more minutes of centrifugal spinning drains all of, or nearly all of, the solvent with the extracted essential oils out from the extraction chamber 202. Accordingly, compared to legacy essential oil extraction systems, the essential oils can be extracted from the organic material in a fraction of the time and with a greater degree of efficiency. Thus, an unexpected benefit of embodiments of the essential oil extraction system 100 is that a larger amount of organic material can be processed in a relatively less amount of time and with a higher degree of efficiency as compared to legacy essential oil extraction systems.

Figure 5:
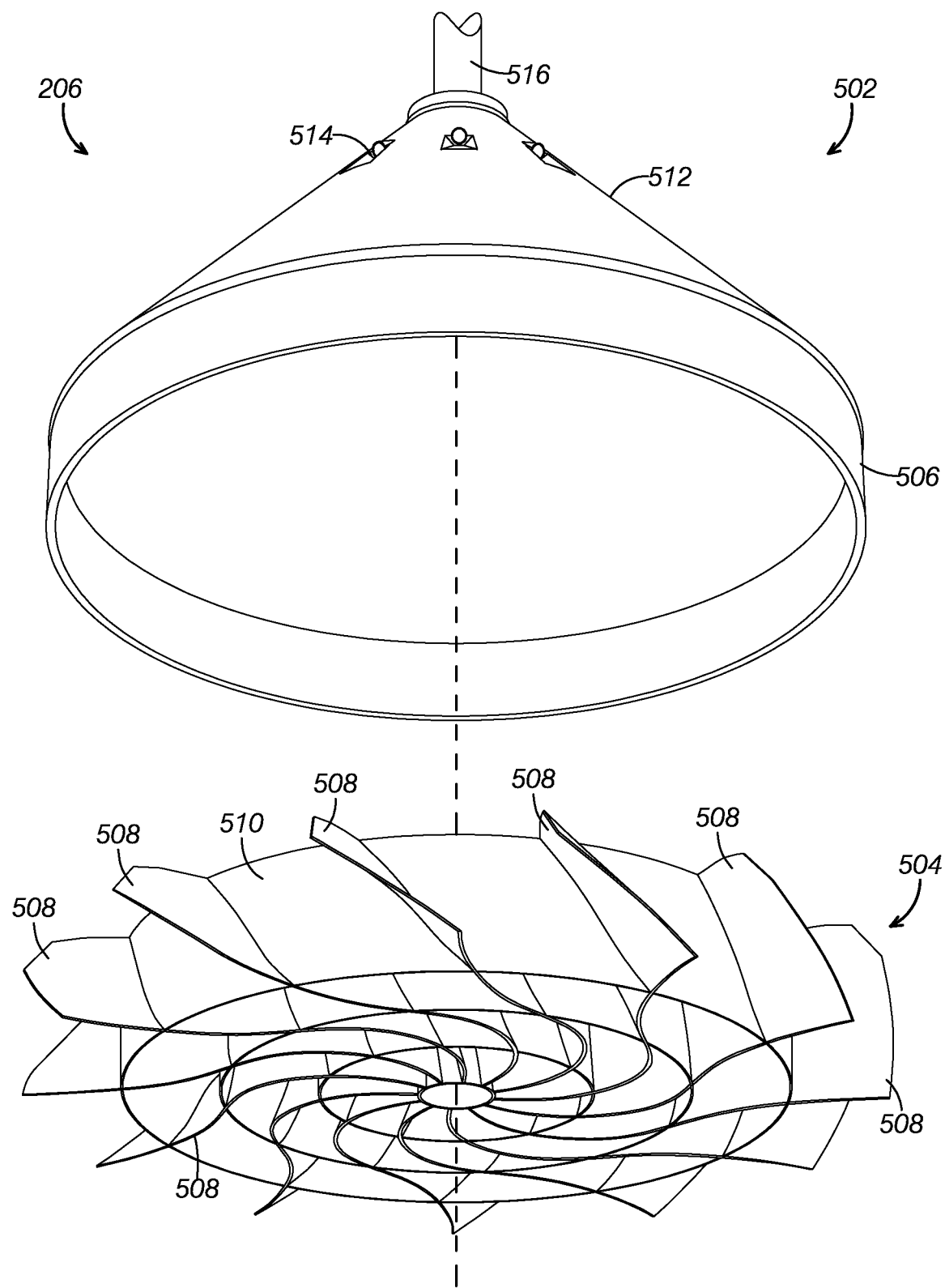
FIG. 5 is an exploded view of an example embodiment of a vortex plunger.
Figure 6:
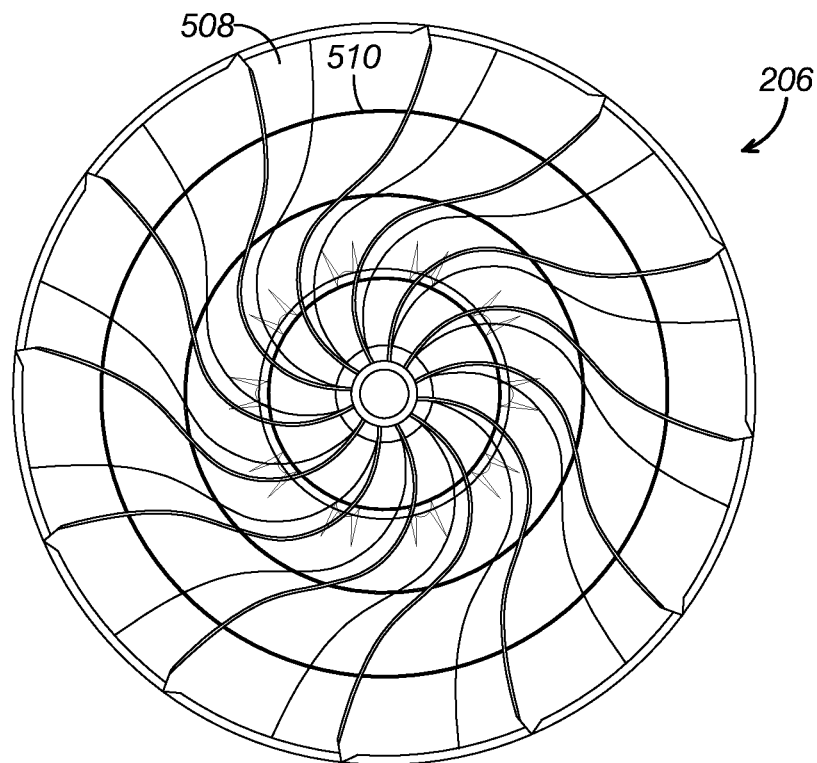
FIG. 6 is a bottom view of the example vortex plunger.
Figure 7:
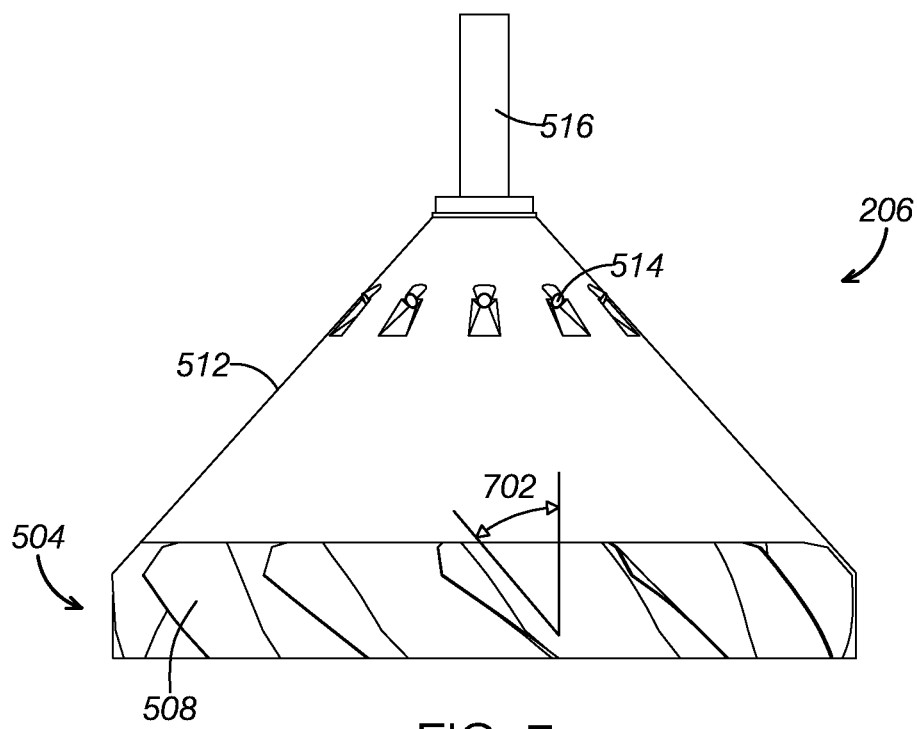
FIG. 7 is a side view of the example vortex plunger.

FIG. 5 is an exploded view of an example embodiment of a vortex plunger 206. FIG. 6 is a bottom view of the example vortex plunger 206. FIG. 7 is a side view of the example vortex plunger 206.

The example vortex plunger 206 comprises a head portion 502 and a grate 504. The grate 504 of the vortex plunger 206 fits within, or partially within, and is secured to the lower interior region 506 of the head portion 502 of the vortex plunger 206. In other embodiments, the top of the grate 504 of the vortex plunger 206 is secured to the lower portion 506. In some embodiments, the grate 504 of the vortex plunger 206 is removably secured to the head portion 502. Accordingly, the grate 504 of the vortex plunger 206 may be removed to facilitate cleaning.

The bottom portion 504 of the vortex plunger 206 comprises a plurality of vortex vanes 508 arranged in a substantially vertical orientation. The vortex vanes 508 may be made of a rigid, or semi rigid, material. Any suitable material may be used, such as plastic, metal, acrylic or the like. The vortex vanes 508 extend from the outer edge of the grate 504 towards the center of the grate 504 in a spiraling fashion. One or more spacer rings 510 hold and secure the vortex vanes 508 in a rigid and fixed position within the grate 504 of the vortex plunger 206.

As the vortex plunger 206 is moved in the repeated upward and downward motion during the agitation process, the solvent is drawn upward and is then pushed downward by the vortex vanes 508, thereby drawing solvent through the organic material filter bag 302. The spiral arrangement of the vortex vanes 508 creates a fluid vortex within the extraction chamber 202 so that solvent swirls through the organic material filter bag 302 and through the organic material therein to improve the extraction efficiency of the solvent.

The pitch angle 702 (FIG. 7) of the vortex vanes 508 may be defined so as to achieve a desired amount of fluid vortex withing the organic material filter bag 302 during the agitation process. Additionally, or alternatively, the width of the vortex vanes 508 may be defined so as to achieve a desired amount of fluid vortex within the organic material filter bag 302 during the agitation process. In embodiments of the vortex plunger 206 that employ a removeable grate 504 of the vortex plunger 206, a plurality of different grates 504 having different, numbers, pitches and sizes of the vortex vanes 508 may be selected by the user based on the characteristics of the organic material and/or based on the number and/or size of the organic material filter bags 302 that are paced within the extraction chamber 202.

The top region of the head portion 502 of the vortex plunger 206 is conical in shape. The conical shape is preferred to receive and expel solvent during the agitation process. Alternative embodiments employ other head shapes. The conical shape of the top of the head portion 502 of the vortex plunger 206 is sized to correspond to the shape of the chamber lid 204 so as to facilitate retraction of the vortex plunger 206 into the chamber lid 204. Further, the head portion 502 of the vortex plunger 206 is sized to fit within the interior of the basket 210.

The top region 512 of the head portion 502 of the vortex plunger 206 may optionally include a plurality of apertures 514 (fluid ports, holes, or the like). The fluid ports 514 permit the movement of air and/or solvent from the interior region of the vortex plunger 206 during the in the repeated upward and downward motion of the vortex plunger 206 during the agitation process. The number and/or size of the apertures may be defined to optimize the characteristics of fluid vortex that is created by the vortex plunger 206 during the agitation process.

The top of the head portion 502 of the vortex plunger 206 is secured to a proximal end of a coupling shaft 516. A distal end of the coupling shaft 516 is coupled to the vortex plunger agitator system 216. Accordingly, the vortex plunger agitator system 216, via the coupling shaft 516, may control the location of the vortex plunger 206 within the essential oil extraction system 100, and control the travel distance D during the agitation process.

Figure 8:
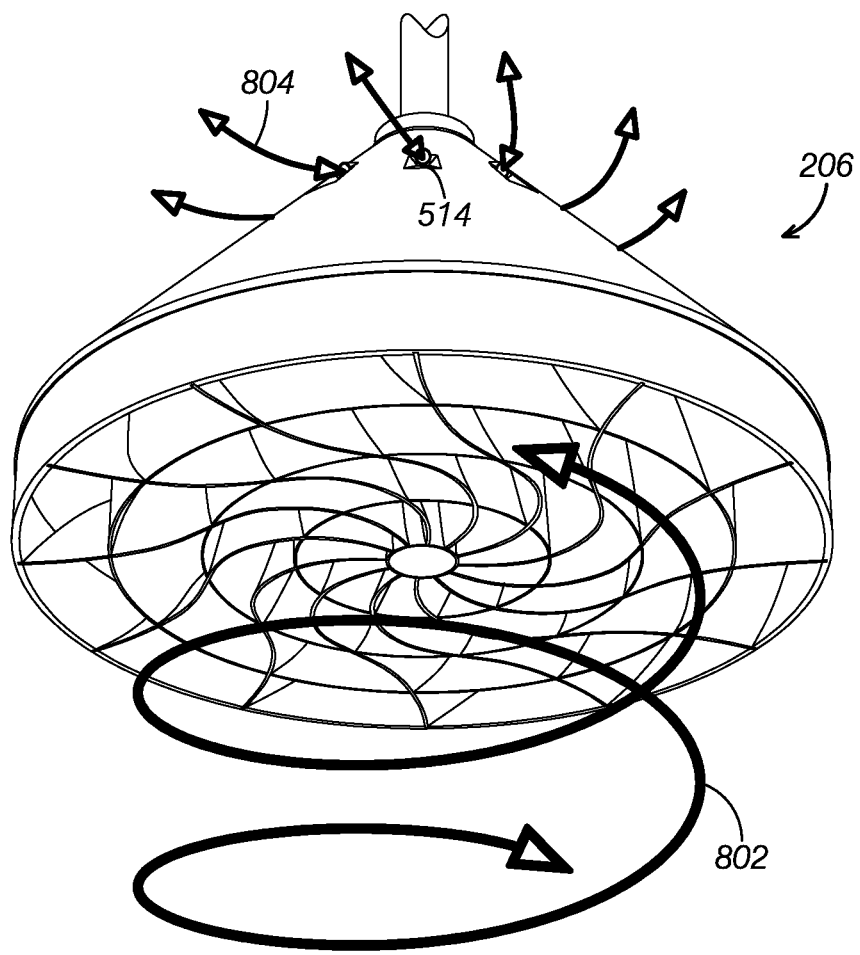
FIG. 8 conceptually illustrates a generated fluid vortex that is created in the solvent by the repeated upward and downward motion of the vortex plunger.

FIG. 8 conceptually illustrates a generated fluid vortex 802 that is created in the solvent by the repeated upward and downward motion of the vortex plunger 206. The fluid vortex 802 is a spiraling upward fluid motion induced into the solvent as the vortex plunger 206 is moved in the upward direction during the agitation process. Accordingly, solvent is drawn or forced upward through the bottom of the organic material filter bag 302 and then through the top of the organic material filter bag 302 during this upward motion of the vortex plunger 206. Conversely, the fluid vortex 802 becomes a spiraling downward fluid motion induced into the solvent as the vortex plunger 206 is moved in the downward direction during the agitation process. Accordingly, solvent is drawn or moved downward through the top of the organic material filter bag 302 and then through the bottom of the organic material filter bag 302 during this downward motion of the vortex plunger 206.

Expelled air and/or solvent 804 is illustrated as exiting the apertures 514 at the top of the vortex plunger 206 as the swirling solvent is drawn upward into the interior of the vortex plunger 206. Any movement of the head either above or below liquid solvent results in air or liquid solvent being taken in or expelled from the apertures 514. An unexpected advantage of the "leak" caused by the apertures 514 also prevents too much pressure on the liquid solvent, thereby allowing the vortex plunger 206 move faster under the liquid solvent while requiring less force to move the vortex plunger 206 during the agitation process.

Accordingly, the repeated upward and downward motion of the vortex plunger 206 during the agitation process generates the fluid vortex 802 that draws the solvent through the organic matter residing in the organic material filter bag 302 to extract the essential oils from the organic matter.

Figure 9:
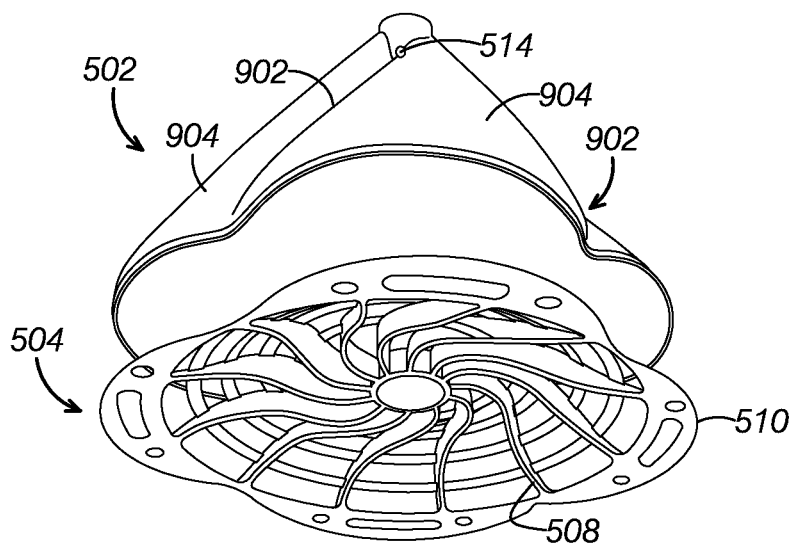
FIG. 9 is an exploded view of an example alternative embodiment of a vortex plunger.
Figure 10:
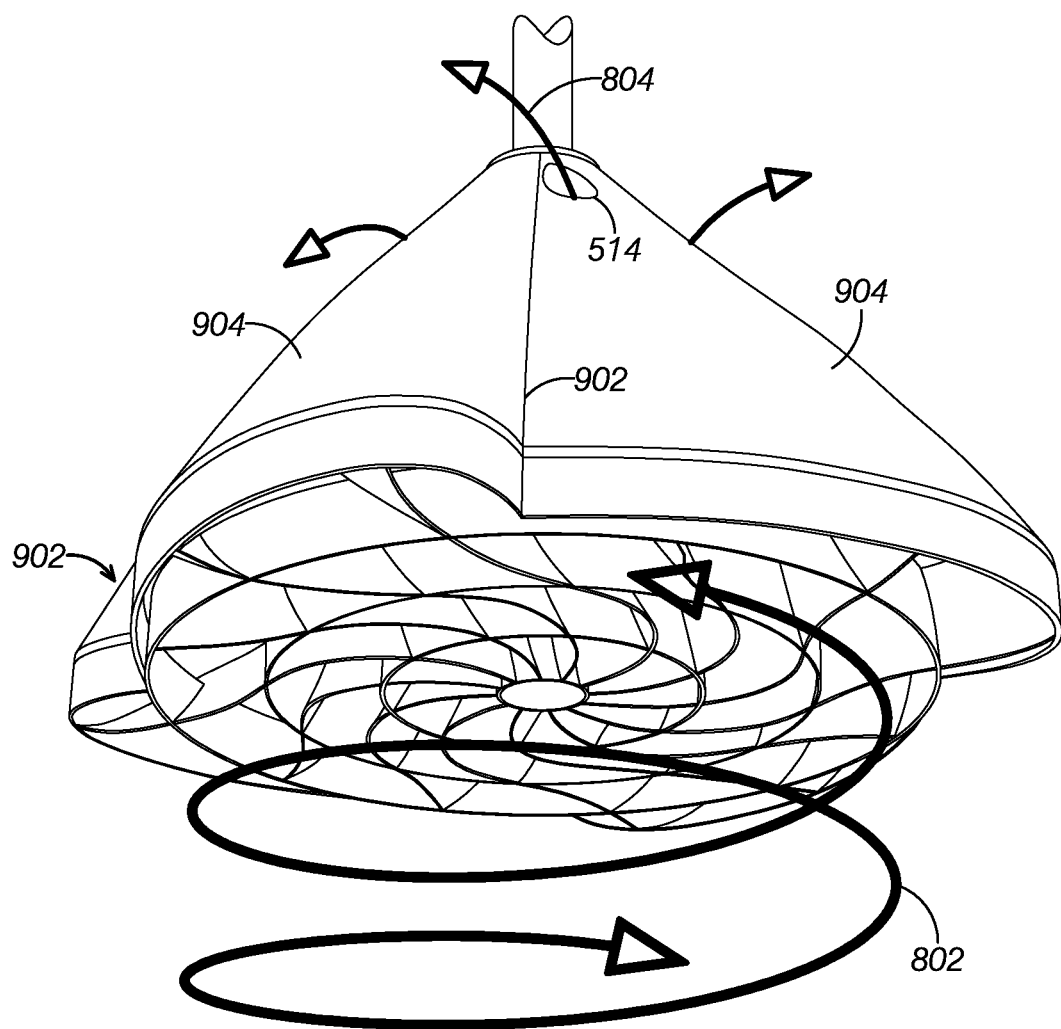
FIG. 10 conceptually illustrates a generated fluid vortex by this alternative embodiment of the vortex plunger.

FIG. 9 is an exploded view of an example alternative embodiment of a vortex plunger 902. FIG. 10 conceptually illustrates a generated fluid vortex 802 by this alternative embodiment of the vortex plunger 902. With this alternative embodiment, the surface of the head portion 502 of the vortex plunger 206 includes a plurality of shallow troughs 902 and a plurality of shallow ridges 904 (as contrasted with the smooth surface of the head portion 502 of the example vortex plunger 206 illustrated in FIGS. 5-8). The troughs 902 and ridges 904 create a slightly twisted conical profile with an aerodynamically lobed outer surface. The lobes are slightly twisted along a longitudinal axis of the vortex plunger 206. The lobes affect the flow vortex of the solvent within the interior of the vortex plunger 206. Accordingly, the lobes affect the characteristics of the fluid vortex 802.

In some embodiments, baffles or other features may be included in the interior or exterior of the vortex plunger 206 to impart dynamic forces on the solvent fluid as it moves through the vortex plunger 206.

In some embodiments, the vortex plunger 206 may be moved in a lateral direction (side to side), and/or may be moved in an angled direction. Alternatively, or additionally, the vortex plunger 206 may be rotated during the extraction process. In some embodiments, the coupling shaft 516 and the head portion 502 of the vortex plunger 206 are configured to rotate at an angle offset from the vertical about a vertical axis located at the end of the coupling shaft 516 distal the head portion 502. In such example where the coupling shaft 516 and the head portion 502 rotate about the vertical axis at an angle offset from vertical, the vortex plunger 206 traces a cone shaped path through the solvent fluid. Such additional or alternative movement directions may be used to modify the characteristics of the generated fluid vortex.

It should be emphasized that the above-described embodiments of the essential oil extraction system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. An essential oils extraction system, comprising:
   an extraction chamber that is a cylindrical wall of rigid material,
      wherein a diameter and a height of the extraction chamber is sized to define an interior that accommodates a desired amount of an organic material having essential oils, and
      wherein an amount of organic material is placed in the extraction chamber before initiation of an extraction process;
   a vortex plunger, comprising:
      a grate with a plurality of vortex vanes arranged in a substantially vertical orientation and a plurality of spacer rings that hold and secure the vortex vanes in a rigid and fixed position within the grate; and
      a head portion, wherein the top of the grate is secured to the bottom of the head portion; and
      a coupling shaft secured to and extending upward from a top of the head portion;
   a chamber lid,
      wherein the chamber lid has a lower rim that is defined by a diameter that corresponds to the diameter of the extraction chamber,
      wherein the lower rim of the chamber lid is configured to mate with a top of the extraction chamber, and
      wherein a middle portion of the chamber lid is shaped to receive the vortex plunger when the vortex plunger is in a retracted position; and
   a vortex plunger actuator system coupled to a distal end of the coupling shaft of the vortex plunger,
      wherein when the organic material and a solvent have been placed into the interior of the extraction chamber, the vortex plunger actuator system is configured to extend the vortex plunger down into the extraction chamber that has been filled with the solvent,
      wherein the vortex plunger actuator system is configured to move the vortex plunger in a repeated upward and downward motion as an agitation process so that the vortex vanes generate a fluid vortex in the solvent, and
      wherein the fluid vortex is configured to cause the solvent to be drawn upward into the organic material and then to be pushed downward through the organic material so that the solvent extracts essential oils from the organic material.

2. The essential oil extraction system of claim 1, further comprising:
   a basket,
   wherein the basket is located within an interior of the extraction chamber, and
   wherein the organic material resides within the basket during the extraction process.

3. The essential oil extraction system of claim 2, further comprising:
   a solvent outlet valve in fluid communication with the extraction chamber,
   wherein an outside diameter of the basket is less than an inside diameter of the extraction chamber to provide a space between an outside surface of the basket and an inside wall of the extraction chamber, and
   wherein the space provides spacing for the solvent with the extracted essential oil to flow through the extraction chamber to the solvent outlet valve after completion of the extraction process.

4. The essential oil extraction system of claim 2, wherein the basket includes a plurality of apertures disposed in a wall of the basket to permit the solvent with the extracted essential oil to flow out from the organic material and into a space between the basket and the extraction chamber.

5. The essential oil extraction system of claim 2, wherein the basket is coupled to a centrifuge motor system, and wherein the centrifuge motor system is configured to spin the basket to create a centrifugal force that draws the solvent with the extracted essential oils out from the organic material.

6. The essential oil extraction system of claim 2, further comprising:
   an organic material filter bag comprised of a liquid permeable fabric,
   wherein the organic material filter bag is configured to be filled with the organic material and is further configured to be placed in the basket prior to initiation of the extraction process.

7. The essential oil extraction system of claim 6, wherein a plurality of filled organic material filter bags are configured to be placed in the basket prior to initiation of the extraction process.

8. The essential oil extraction system of claim 1, wherein the vortex vanes are secured in the grate at a predefined pitch angle, and wherein the pitch angle of the vortex vanes controls a characteristic of the fluid vortex that is generated as the vortex plunger is moved in the repeated upward and downward motion during the agitation process.

9. The essential oil extraction system of claim 1, wherein the vortex vanes extend from an outer edge of the grate towards the center of the grate in a spiraling fashion.

10. The essential oil extraction system of claim 1, wherein the lower rim of the chamber lid is pivotably attached to a top of the extraction chamber.

11. The essential oil extraction system of claim 10, further comprising:
    a lid opening and closing actuator coupled to the chamber lid,
    wherein the lid opening and closing actuator is configured to open the chamber lid so that the organic material is placed into the extraction chamber prior to initiation of the extraction process, and
    wherein the lid opening and closing actuator is configured to close the chamber lid prior to initiation of the extraction process and after the organic material is placed into the extraction chamber.

12. The essential oil extraction system of claim 1, further comprising:
    a solvent inlet valve fluidly coupled to the extraction chamber,
    wherein the solvent inlet valve is coupled to a hose that fluidly connects the solvent inlet valve to a solvent source,
    wherein solvent flows from the solvent source into the extraction chamber via the solvent inlet valve when opened, and
    wherein the extraction chamber is filled with the solvent to cover the organic material placed in the extraction chamber.

13. The essential oil extraction system of claim 1, wherein the vortex plunger actuator system is controllably coupled to a controller, and wherein a travel distance that defines a distance of the repeated upward and downward motion of the vortex plunger during the agitation process is configured to be specified via the controller.

14. The essential oil extraction system of claim 1, wherein the vortex plunger actuator system is controllably coupled to a controller, and wherein a distance that the vortex plunger is extended downward from the chamber lid into the interior of the extraction chamber prior to initiation of the agitation process is configured to be specified via the controller.

15. The essential oil extraction system of claim 1, wherein the extraction chamber is fluidly coupled to a solvent source, wherein the solvent source is controllably coupled to a controller, and wherein one of a temperature or a temperature range of the solvent that is maintained by the solvent source such that a chilled solvent at the specified temperature or temperature range is added into the extraction chamber prior to initiation of the extraction process is configured to be specified via the controller.

16. The essential oil extraction system of claim 1, wherein the essential oil extraction system is configured to:
    rotate a basket containing the organic matter,
    wherein the basket resides within the extraction chamber, and
    wherein the rotation of the basket creates a centrifugal force that extracts the solvent with the extracted essential oils from the organic material.

17. The essential oil extraction system of claim 16, wherein an organic material bag that is filled with the organic material is configured to be placed into the basket prior to initiation of the extraction process.

* * * * *